H. R. SHAFER.
RESILIENT WHEEL.
APPLICATION FILED JAN. 19, 1921.
1,421,584.
Patented July 4, 1922.
2 SHEETS—SHEET 1.
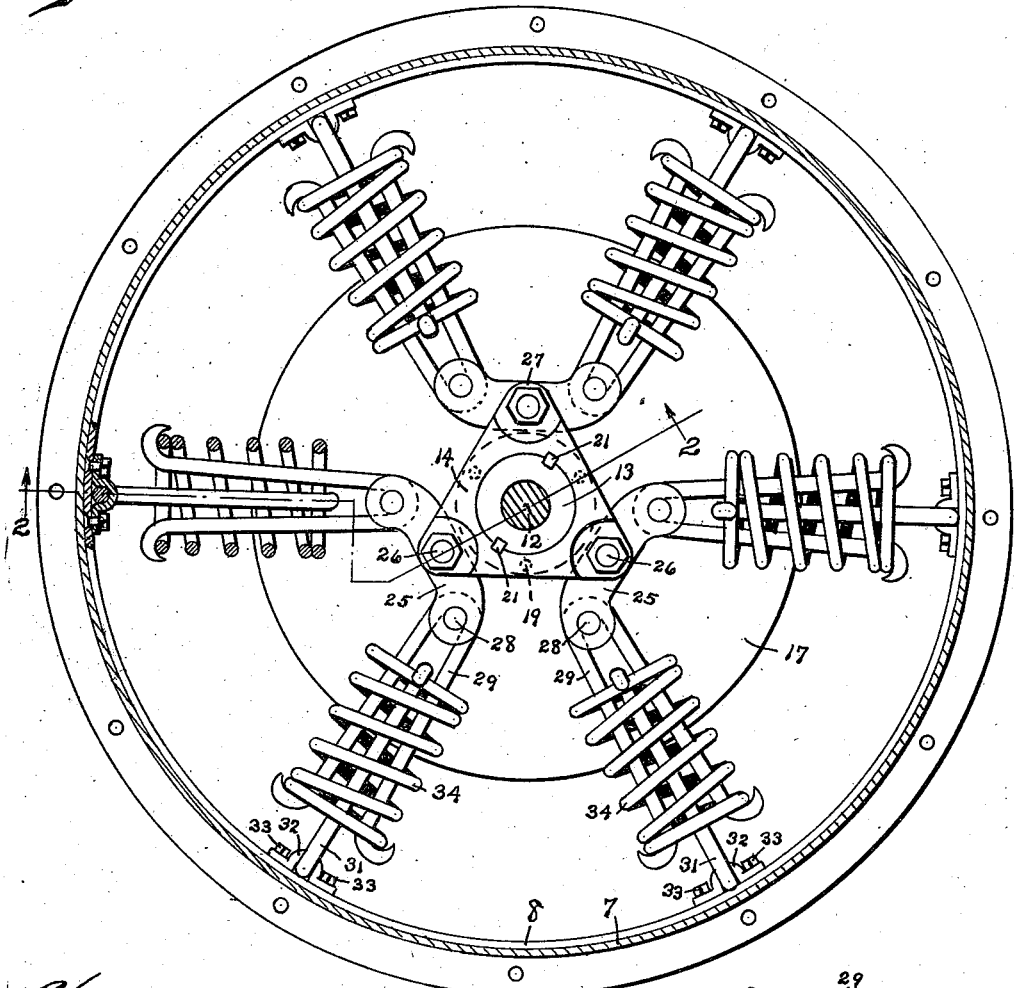
Fig. 1
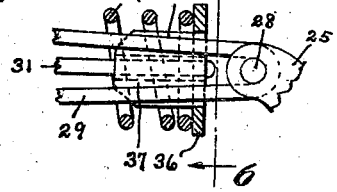
Fig. 5
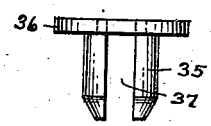
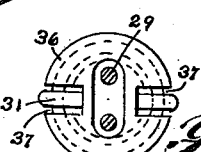
Fig. 6
Fig. 7
INVENTOR.
Homer R. Shafer
BY
Edward N. Pagelsen
ATTORNEY.

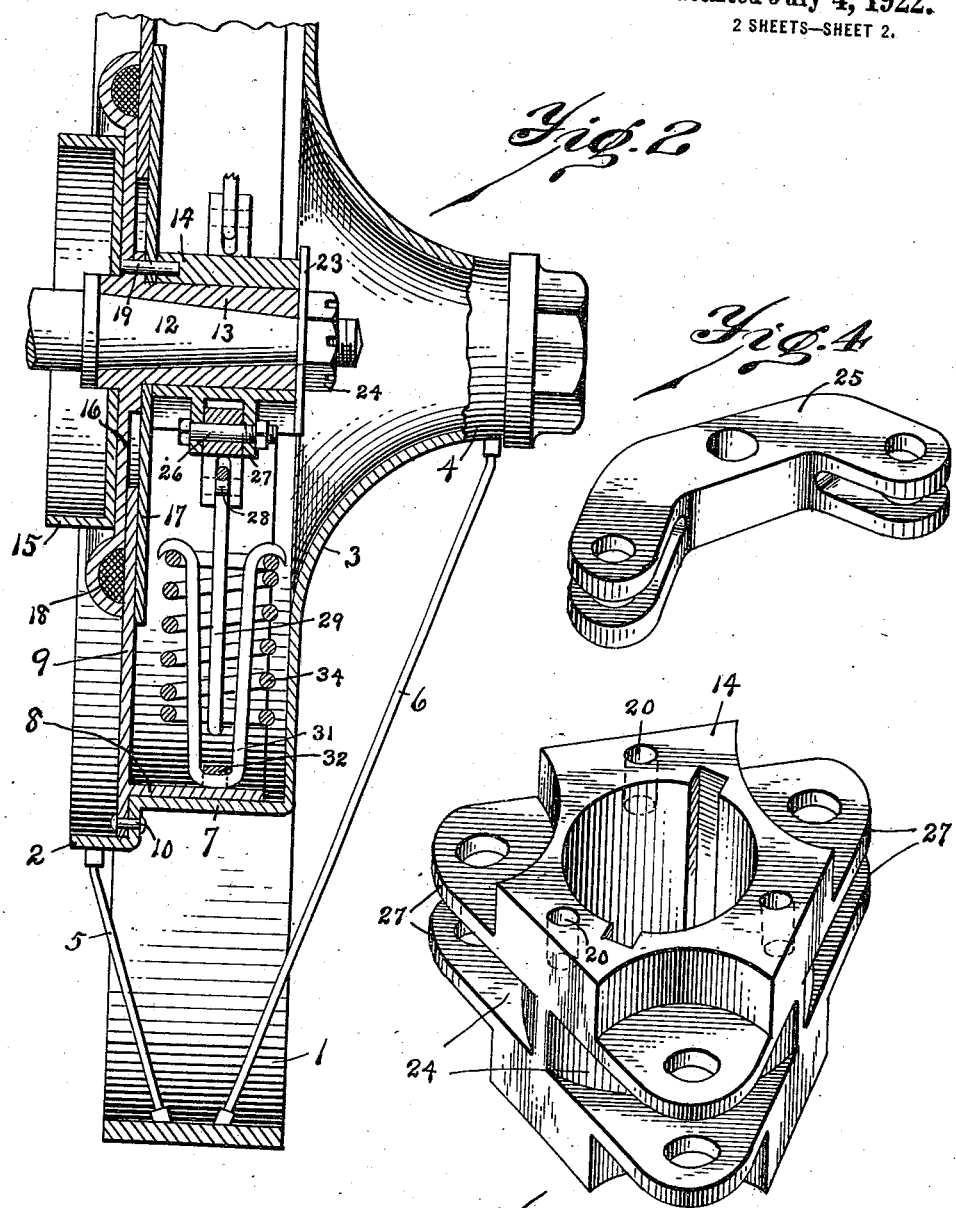

UNITED STATES PATENT OFFICE.

HOMER R. SHAFER, OF DETROIT, MICHIGAN.

RESILIENT WHEEL.

1,421,584.  Specification of Letters Patent.  Patented July 4, 1922.

Application filed January 19, 1921. Serial No. 438,314.

*To all whom it may concern:*

Be it known that I, HOMER R. SHAFER, a citizen of the United States, and residing at Detroit, in the county of Wayne and State of Michigan, have invented a new and Improved Resilient Wheel, of which the following is a specification.

This invention relates to resilient wheels for vehicles, and its object is to provide a wheel with coil springs between the rim and hub which are so stiff as to prevent an excess of movement between the rim and hub, but at the same time are sufficiently yielding to permit the rim to pass over minor obstructions without affecting the axle of the vehicle.

This invention consists in a hub member and a cylindrical member of greater diameter to which the spokes and rim are attached, a series of levers pivoted on the hub member, and coil springs between the hub member and the cylindrical member.

It further consists in a series of compression springs and connectors between the outer ends of the springs and the ends of the levers on the hub member and other connectors between the inner ends of the springs and the outer cylindrical member.

It also consists in the details of construction illustrated in the accompanying drawings and particularly pointed out in the claims.

In the drawings, Fig. 1 is an elevation of the central portion of my resilient wheel illustrating the radial springs which hold the parts in normal position. Fig. 2 is a section of my improved wheel on the line 2—2 of Fig. 1. Fig. 3 is a perspective of the hub sleeve. Fig. 4 is a perspective of one of the spring-supporting levers. Fig. 5 is a section of the inner end of a spring showing a thimble in position. Fig. 6 is an end elevation and Fig. 7 a side elevation of the thimble for centering the springs.

Similar reference characters refer to like parts throughout the several views.

Referring to Fig. 2, the outer rim 1 of my improved wheel is shown to connect to a cylindrical flange 2 of the shell 3 of the wheel and to the reduced portion 4 thereof by means of the spokes 5 and 6. Within the cylindrical portion 7 of this shell is a cylindrical member 8 to which is attached a radial plate 9 whose outer edge may be attached to the shell by means of rivets 10. These parts form no part of the present invention in themselves, and any other desired wheel construction, which embodies a cylindrical member 8 rigidly connected to the rim, may be employed.

Secured to the tapering end 12 of the axle, or rotatable thereon, is a hub consisting of the inner portion 13 and a sleeve 14. Attached to the part 13 is a brake drum 15 and two radial plates 16 and 17, between which slidably extends the radial plate 9 mounted on the outer portion of the wheel. The plate 16 is preferably formed with a circumferential groove to receive the packing 18 which prevents dust entering the space within the shell 3. Pins 19 extend through the plates 16 and 17 into holes 20 in the hub sleeve 14. This sleeve may be attached to the inner portion 13 by means of keys 21 or may be made integral therewith. In the present case it holds the plate 17 in position. The washer 23 and nut 24 hold the hub members in position on the axle. It will be understood that any other desired arrangement of the brake drum 15 and of the radial plates 9, 16 and 17 may be employed, but such plates are of value for preventing relative movement longitudinally of the shaft between the hub and the remainder of the wheel.

The sleeve 14 is formed with a series of circumferential grooves 24 in which the levers 25 may be mounted on the pins 26, which pins are carried by the ears 27 on this sleeve. In the ends of these levers are the pins 28 which extend through the loops at the inner ends of the yokes 29. The loops at the outer ends of similar yokes 31 extend beneath the straps 32 secured to the cylindrical member 8, in any desired manner, screws 33 being shown. The ends of these yokes are curved outward and engage the ends of compression springs 34 which are initially tensioned when the wheel is assembled.

In order to keep the yokes properly centered, the thimbles 35 may be mounted in the ends of the springs, the bodies and flanges 36 thereof being formed with transverse slots 37 to receive the adjacent portions of the yokes.

The peculiar mounting of the springs and their yokes on the ends of the levers 25 permits the hub to turn through a limited angle and to move in any direction within the cylindrical member 8, but such movements are always resisted by at least three of the springs 34. The result is a wheel of great resiliency on which the limit of movement is soon reached and the movement checked by the heavy compression springs.

The details of construction may all be changed by those skilled in the art without departing from the spirit of my invention as set forth in the following claims.

I claim:—

1. In a resilient wheel, the combination of a hub member, a series of equally spaced pins mounted on the hub member parallel to the axis thereof, a lever mounted on each pin, an outer cylindrical portion of the wheel, and resilient tension members extending in the same plane from both ends of the levers at equal distances from the pivots thereof radially to the outer cylindrical portion.

2. In a resilient wheel, the combination of a hub member, a series of equally spaced pins mounted on the hub member parallel to the axis thereof, a lever mounted on each pin, an outer cylindrical portion of the wheel, and resilient tension members extending in the same plane from both ends of the levers at equal distances from the pivots thereof to the outer cylindrical portion.

3. In a resilient wheel, a hub member, an axle therein, a ring, and means to resiliently suspend the hub and the axle within the ring embodying pairs of resilient tension members extending inward from said ring, levers connecting the inner ends of the resilient tension members in pairs, and pins connecting the middle points of the levers to the hub.

4. In a resilient wheel, a hub member, an axle therein, a ring and means to resiliently suspend the hub and the axle within the ring embodying pairs of resilient tension members extending radially inward from said ring, levers connecting the inner ends of the resilient tension members in pairs, and pins connecting the middle points of the levers to the hub.

HOMER R. SHAFER.